Sept. 6, 1966     B. EPHRAIM     3,270,438
TESTING AND MONITORING APPARATUS
Filed Aug. 12, 1963     3 Sheets-Sheet 1
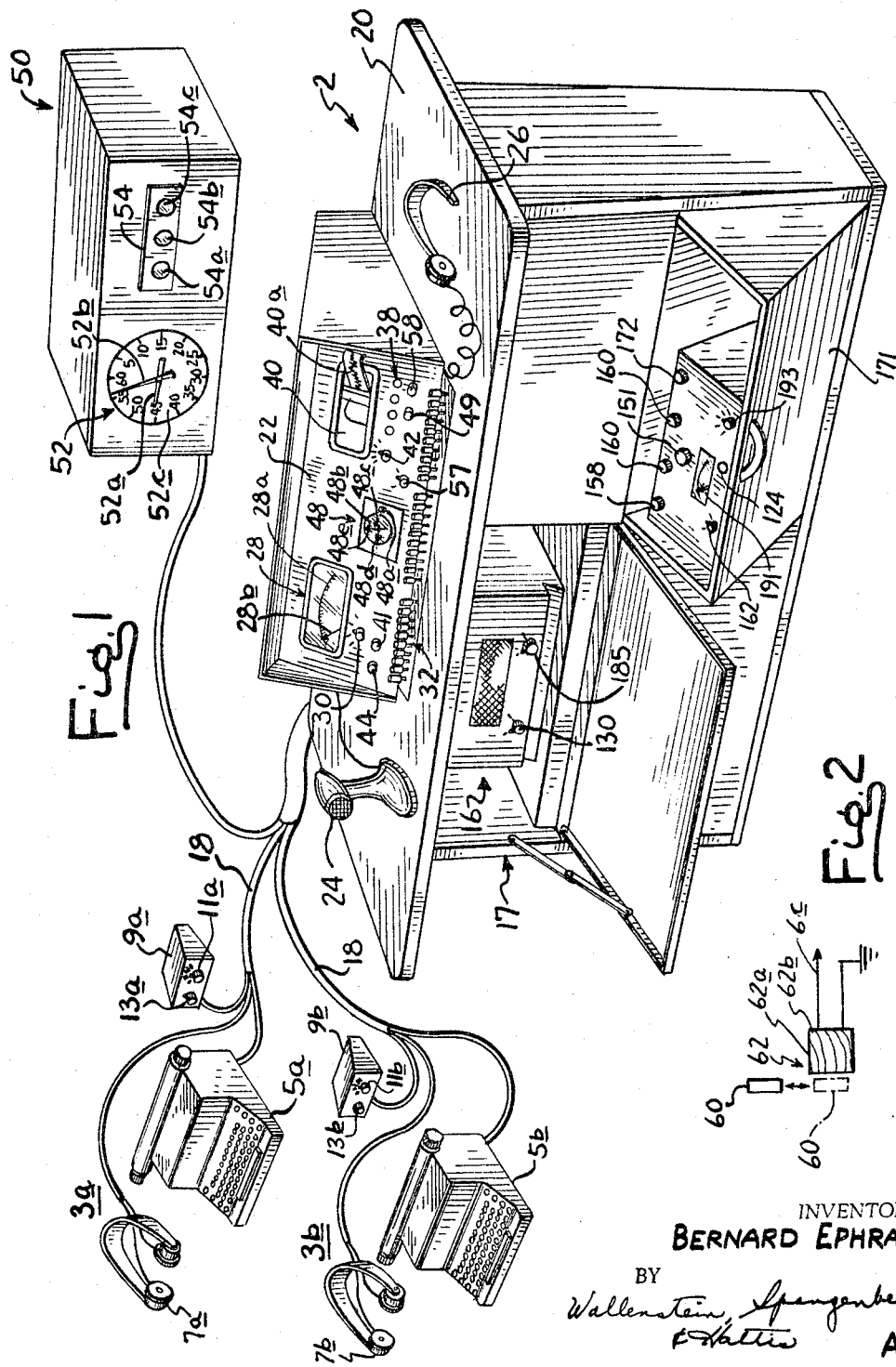
INVENTOR.
BERNARD EPHRAIM
BY
Wallenstein, Spangenberg
& Hattis
ATTYS.

Sept. 6, 1966　　　　　　　B. EPHRAIM　　　　　　　3,270,438
TESTING AND MONITORING APPARATUS
Filed Aug. 12, 1963　　　　　　　　　　　　　　　　3 Sheets-Sheet 2

INVENTOR.
BERNARD EPHRAIM
BY Wallenstein Spangenberg & Hattis
ATTYS.

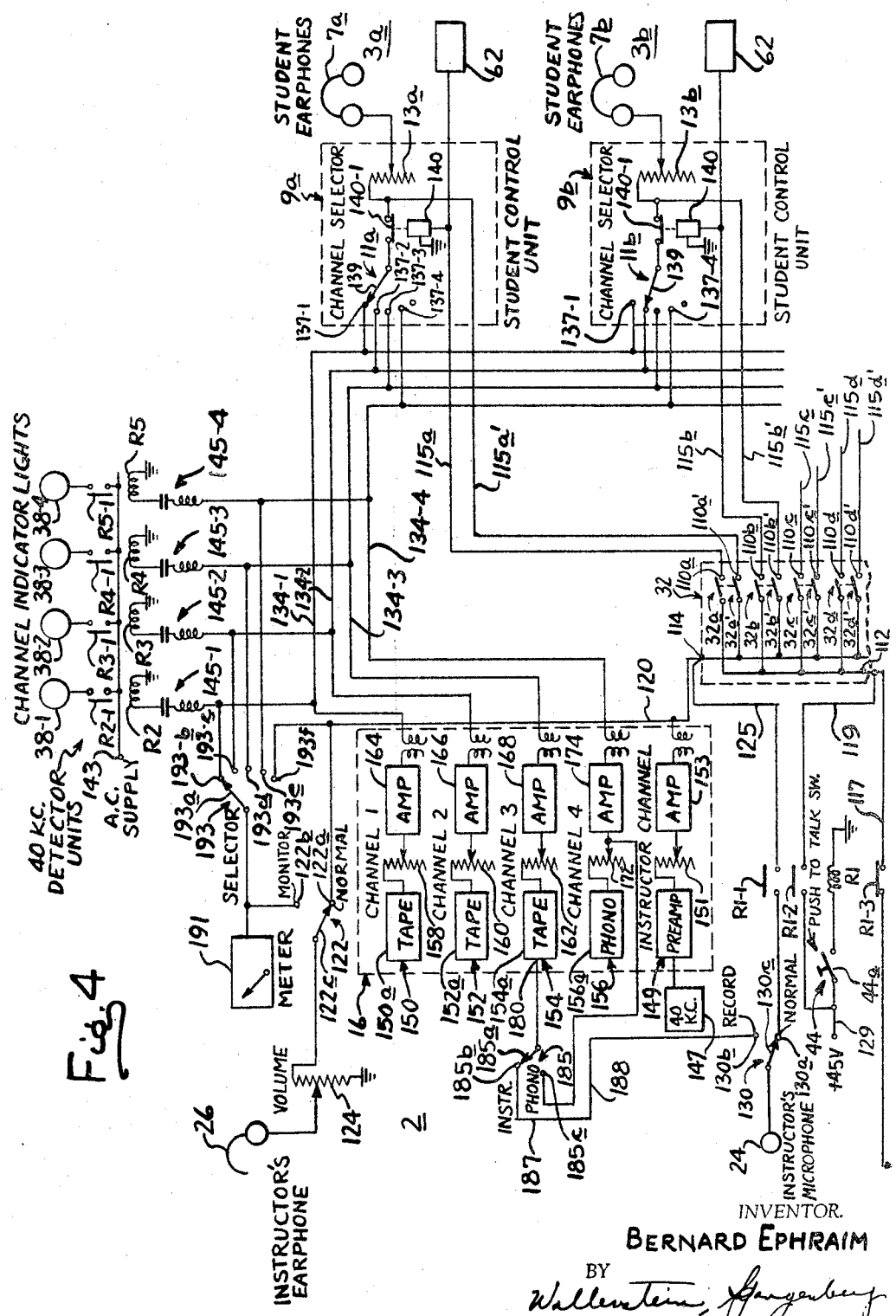

3,270,438
TESTING AND MONITORING APPARATUS
Bernard Ephraim, Chicago, Ill., assignor to Rich Engineering, Inc., Franklin Park, Ill., a corporation of Illinois
Filed Aug. 12, 1963, Ser. No. 301,349
11 Claims. (Cl. 35—5)

This invention relates to testing and monitoring apparatus, and has its most important application in the measuring and indicating the typing speed and rhythm. Some aspects of the invention, however, have a broader application as, for example, in langauge laboratories and other applications wherein an instructor communicates individually with the students in the class and the instructor is provided with means for measuring the proficiency of the student in accordance with the student's operation of a device of some sort which tests the student's knowledge or ability.

Various devices for measuring and indicating typing speed have, heretofore, been developed. For various reasons, these devices leave much to be desired. For example, many of these devices provide means for providing a count of each stroke of the type keys and spacer bar or every five strokes thereof. A measure of the average typing speed, however, requires visual observation of a clock so that the count can be related to a base time period. Also, these devices give no indication of instantaneous typing speed or rhythm, which enables an instructor better to evaluate the student's abilities.

One of the aspects of the present invention is the provision of typing speed measuring and indicating apparatus which automatically provides an immediate visible indication and a permanent record of instantaneous typing speed and rhythm in addition to an indication of average typing speed over a predetermined given base period. In accordance with the most preferred form of the invention, the indication of instantaneous typing speed and rhythm is obtained by providing a pulse generating means for generating a unidirectional pulse of a standard width and amplitude each time the operator depresses a type key or spacer bar. An integrating circuit is provided which measures the average amplitude or area over the base period referred to of a few successive pulses (at the lower rates to be measured) produced by the pulse generating means. A recorder, such as a strip chart recorder, is preferably provided for providing a continuous and permanent record of the variations of the instantaneous typing speed and rhythm.

In accordance with another aspect of the present invention, the instructor is provided with a unique improved arrangement of switching and indicating apparatus for enabling the instructor to communicate individually with, and control and monitor, individual student practice and testing stations. For example, where this aspect of the invention is applied to a typewriter instruction class, each student station is provided with a speaker device, such as an earphone, and an information channel selector switch for enabling the student to select any one of a number of information channels giving dictation information at different word rates. The instructor's position is provided with typewriter speed and rhythm measuring and indicating apparatus as described above which can be selectively connected by means of a student selector switch to pulse generators at each of the student stations which generates a pulse each time the type key or spacer bar of the typewriter thereat is operated. The student selector switch most advantageously is provided with a section which interconnects the typing speed and rhythm measuring and indicating apparatus to the pulse generator referred, and a section which interconnects an instructor's microphone and earphone to the earphone of the selected student station, so that the instructor can listen-in on the informaiton channel selected by the student thereat and communicate with the student.

Another important feature of the invention is the provision of an instructor talk switch which enables the instructor to disconnect the student's earphones from the information channel selected by the student. Still another important feature of the invention is the provision of indicator lights which indicate the information channel selected by the student. In accordance with a specific aspect of the invention, both of these features are provided in an exceedingly simple and inexpensive way which does not require any additional wiring between the instructor and student stations.

The above and other features and advantages of the invention will become more apparent upon making reference to the specification to follow, the claims and the drawings wherein:

FIG. 1 is a perspective view of an exemplary typewriter speed and rhythm monitoring system of the invention with an instructor station and a number of student stations which are useful in a typewriting teaching class;

FIG. 2 shows a magnetic core pulse generator unit mounted on a typewriter for generating a pulse each time the type key or spacer bar thereof is depressed;

FIG. 3 is a circuit and block diagram illustrating the typewriter speed and rhythm measuring section of the present invention which measures and indicates the typing speed and rhythm of a selected student station; and FIG. 4 is a circuit and block diagram illustrating the other sections of the system shown in FIG. 1.

Referring now in particular to FIG. 1 of the drawings where the components of a complete student monitoring system for a typewriter class are shown. The system includes an instructor station 2 and a number of student stations 3a, 3b, etc. at which typewriters 5a, 5b, etc. are located. Each of the student stations has an earphone 7a, 7b, etc. electrically connected to a switch box 9a, 9b, etc. which has an information channel selector switch 11a, 11b, etc. for selecting one of a number of information channels transmitting information to be typed at a different word rate. Each switch box 9a, 9b, etc. further has a volume control unit with a knob 13a, 13b, etc. for adjusting the volume of the sound in the earphones 7a, 7b, etc. The source of the information on the information channels may be a tape and phonograph unit 16 contained behind a pull-out panel of a console or cabinet 17 at the instructor station 2.

Each of the typewriters 5a, 5b, etc. is provided with a suitable pulse generating unit not shown in FIG. 1 which generates a pulse each time the operator pushes a type key or spacer bar on the typewriter. These pulses are carried by suitable conductors, along with other conductors associated with the switch boxes 9a and 9b, in suitable cables 18 to the instructor station console 17.

The console 17 may be provided with a desk top 20 above the level of which upwardly extends a control and indicating panel 22. The desk top 20 may support a suitable instructor's microphone 24 and earphone 26 by means of which the instructor is able to listen-in on and communicates with any of the student stations in a manner to be explained.

The control and indicating panel 22 is provided with a meter 28 mounted therein having a visible scale 28a over which a pointer 28b moves to indicate the instantaneous typing speed and rhythm of a selected student station. A scale factor varying switch 30 may be provided on the panel 22 for changing the sensitivity of the meter, so that maximum scale deflection of the pointer 28b can represent different typing speeds. The scale 28a has a separate scale for each range of the meter 28 calibrated in words per minute. Thus, the instantaneous position of the pointer 28b indicates the typing speed and the relative steadiness of this pointer indicates the rhythm of the typing at the selected student station.

The student station monitored by the instructor is selected by student select switches 32 on the console 17 adjacent to the panel 22. The student select switches illustrated includes an individual switch 32 for each student station. Operation of one of these switches connects the pulse generating unit of the student station involved to a typewriter speed measuring and indicating circuit to be described and the instructor's microphone 24 and the earphone 26 to the student earphone 7a, 7b, etc. at the selected student station, so that the instructor can listen-in on the information channel selected by the student involved and talk with the student. The information channel selected at the student station involved is identified by the energization of one of a series of indicator lights 38 mounted on the panel 22, the indicator lights respectively representing the various information channels which can be selectable by the students.

A permanent record of the instantaneous variations in typing speed and rhythm of a selected student station is provided by a suitable strip chart recorder 40 mounted on the panel 22. The recorder draws a graph of the typing speed variations on a paper strip 40a accessible to the instructor on the front of the panel, so that he can cut the front section of the strip which was last marked by the recorder from the rest of the strip and then write the name of the student involved thereon. If desired, an automatic strip marking means may be provided so that operation of one of the switches 32 will automatically print information identifying the student station involved on the portion of the strip 40a in position to be marked by the recorder. A scale factor selector switch 42 is mounted on the panel 22 for adjusting the sensitivity of the recorder 40 to indicate a wide range of word speeds.

The control panel 22 also has a push to talk switch 44 which is depressed by the instructor when he desires to speak to the student at the student stations selected by operation of one of the switches 32. Depression of the switch 44 automatically disconnects the student's earphone 7a, 7b, etc. at the selected student station from the information channel selected by the student so the student will be able to hear the instructor easily.

The monitoring system also provides an indication of average typing speed over a predetermined base period controlled by a timer 48 mounted on the control panel 22. The timer 48 has a timing control knob 48a by means of which this base period or timing interval can be adjusted. The timer 48 also has a visible dial 48b having an index pointer 48c which indicates on a calibrated scale the timing interval provided by the timer and a minutes and seconds hand 48d and 48e which indicates on a calibrated scale the lapsed time since the beginning of the timing interval. A manual reset switch 49 is provided on the panel 22 for resetting the timer and other parts of the system to be described.

A remote indicator cabinet 50 is provided which is visible to both the instructor and the students in the class. This cabinet includes a resettable clock unit 52 which has a dial face 52a over which minutes and seconds hands 52b and 52c move to indicate the lapsed time of the timing interval. Thus, the hands of the clock unit 52 indicates the same information as the minutes and seconds hands of the timer 48.

The remote indicator cabinet 50 also has a digital light indicator unit 54 with hundreds, tens and units Nixie indicators 54a, 54b and 54c which indicate the hundreds, tens and units digits of a number representing the number of character and space or word units typed by the student at the selected student station since the beginning of the timing interval involved. Nixie light indicators are well known devices having ten input terminals which respectively produce the digits 0 through 9 when energized by a suitable voltage.

An add-divide switch 57 may be mounted on the panel 22. In the "divide" position thereof, the numbers indicated by the indicator unit 54 indicates the number of words typed by the student at the selected student station, assuming five type or space units per word. In the "add" position of the switch 57, the indicator unit 54 indicates the total number of type and space units typed by the student at the selected student station.

The pulse generator units of the typewriters may take a variety of forms. Most typewriters have an escapement bar 60 (FIG. 2) which moves each time a type key or spacer bar is depressed. Each pulse generator unit may comprise a magnetic core unit 62 mounted on a stationary part of the typewriter frame. The magnetic core unit includes a suitable core 62a of magnetic material and windings 62b thereon. The core is positioned in the path of movement of the escapement bar 60. In the embodiment illustrated, when a type key or spacer bar is depressed, the escapement bar 60 will move down into a position contiguous to the core and when such key or bar is released the escapement bar 60 moves away from the core. The resulting motion of the escapement bar 60, which is assumed to be made of a ferrous metal, generates a pulse in the windings of the magnetic core unit which appear on output conductors 62c. These conductors 62c are connected to one of the student station select switches 32 so that operation of the latter will couple the magnetic core unit involved to the input of the typewriter speed and rhythm indicating circuit.

Now that the basic components of the monitoring system have been introduced, the circuits which operate the same will be described. Refer now to FIG. 3 which illustrates the typewriter speed and rhythm indicating circuit 70 which responds to the pulses generated by the pulse generator unit of the typewriter at a selected student station by operating the instantaneous typing speed indicating meter 28 and the strip chart recorder 40, and the average typing speed indicator unit 54. The input to the circuit 70 extends to the input of a suitable pulse amplitude varying potentiometer 72 which is connected to the input of a pulse amplifier 74. Two output branches extend from the pulse amplifier 74. One of these extends to another pulse amplifier 76, the output of which may be connected to a differentiating and clipper circuit 78.

It should be understood that the amplitude and width of the rectangular pulses fed from the magnetic core unit coupled to the input of the circuit 70 will vary, for example, with the length of time that the key or spacer bar is depressed. In accordance with one aspect of the invention, these variable width pulses are converted to unidirectional pulses of a standard amplitude and width by a pulse forming circuit which includes the differentiating and clipper circuit 78. The circuit 78 includes a capacitor 78a and a resistor 78b which produce negative and positive voltage spikes respectively at the negative and positive going portions of the rectangular pulse at the output of the pulse amplifier 76. Only the spike coinciding with the leading edge of this pulse is coupled through a rectifier 78c to the input of a one shot multi-vibrator circiut 80 which produces, in a well known manner, a standard pulse of a fixed amplitude and width in response to each control pulse fed thereto. The standard pulse is utilized to control the indication on the instantaneous typing speed meter 28 and strip chart recorder 40 which in effect provides an indication corresponding to the average amplitude of one or a few of these pulses.

The meter 28 is a direct current meter having one of its terminals connected to the range switch 30. In the illustrated circuit, the range switch includes a movable contact 30a selectively engageable with one of a number of stationary contacts 30b. A resistor 30c is connected between each of the stationary contacts 30b and a common line 81 leading to the last-mentioned terminal of the meter 28. Each of the resistors 30c has a different value so as to vary the sensitivity of the meter circuit. That is to say, the average current which flows through the meter 28 for a given pulse repetition rate will vary with the value of the resistor 30c. In this way, the maximum deflection of the pointer on the meter face will represent different typing speed rates for the different positions of the movable switch contact 30a. The damping factor of the meter 28 itself has an averaging effect but it is desirable to add a capacitor 83 across the meter movement 28 per se or across the meter movement and the resistor 30c in series therewith to provide an averaging or integration of the pulse output of the one shot multivibrator circuit 80 over a base period including one or a few pulses at the lowest typing rate to be measured.

The standard pulse output of the one shot multivibrator 80 is also coupled to the strip chart recorder 40. An input amplifier 83 is utilized to amplify the standard pulses fed to the recorder. The output of the amplifier 83 is connected to an integrating circiut 85, which may comprise a capacitor and a resistor in parallel, to provide a D.C. voltage which is proportional to the average amplitude over a base period including one or a few of the standard pulses at the lowest rate to be measured. The output of the integrating circuit 85 is connected through a suitable range switch 42 and resistor network like the switch 30 and resistor network just described to the strip chart recorder 40 so that the deflection of the pen of the strip chart recorder 40 for a given pulse repetition rate can be varied.

The other branch extending from the pulse amplifier 74 extends to a divide by five circuit generally indicated by reference numeral 90. This circuit may be any suitable pulse divider circuit which produces a single pulse output fo reach five pulses fed to the input thereof. In effect, therefore, the number of pulses which appear at the output of the divide by five circuit 90 over a given time interval is a measure of the number of words typed based on five type or space units per word. The output of the divide by five circuit 90 is connected to a stationary contact 57a of the add-divide switch 57. The switch 57 also has a stationary contact 57b which is connected to the input side of the divide by five circuit 90. A movable contact 57c makes selective contact between the contacts 57a and 57b. When the movable contact 57c is in the stationary contact 57b, it is apparent that the divide by five circuit 90 is bypassed and the number of pulses appearing on the movable contacts 57c over a given time interval is a direct measure of the number of type and space units typed on the typewriter at the selected student station.

The movable contacts 57c of the switch 57 is connected to timer contacts 47 which are closed during the timing interval of the timer 48. Thus, if the timer is adjusted to a two minute timing interval, the contacts 47 will be closed for a two minute period during which time the pulses on the movable contacts 57c of the switch 57 is connected to the input of a conventional pulse counter 91. The counter 91 may be a binary counter and the output of the binary counter 91 is fed to a binary to digital converter 93 which produces a digital output in a conventional way. As illustrated, the binary to digital converter 93 has three groups of ten output lines each representing the digits 0–9. These groups of lines may be fed to suitable amplifiers generally indicated by reference numeral 95, the outputs of which are shown connected to the respective input terminals of Nixie indicators 54a, 54b and 54c.

The timer 48 is controlled by a circuit which includes a branch extending from the output of the pulse amplifier 74. This branch is connected to a timer control circuit 100 which may be a bistable circuit having a set and a reset state. The output of the bistable 100 is connected to a suitable switch circuit which may include a transistor 102 and a timer control relay Ry connected in the load circuit of the transistor. When the bistable 100 is in its reset state, a D.C. voltage is fed from the bistable to the base electrode of the transistor of a polarity (positive) which renders the transistor non-conductive. When the bistable 100 is in its set state, the voltage delivered from the bistable to the base electrode of the transistor is of a polarity (negative) which renders the same conductive to energize the relay Ry. When the bistable 100 is in its reset state, any pulses delivered to the input of the circuit 70 will set the timer bistable 100 to start a timing interval.

The timer 48 may be any one of a number of well known timers as, for example, the timer disclosed in U.S. Patent No. 2,868,247. The timer 48 has three states of operation, one to be referred to as a reset state where the feeding of an energizing voltage to the input 48f of the timer will trigger the timer into a state referred to as a timing state, which initiates the timing interval set by the control knob 48a, when the timer contacts 47 are closed and the minutes and seconds hands 48d and 48e start moving from a zero position. The timer also has an inactive state of operation at the end of the timing interval and before the resetting thereof where the contacts 47 are open and the minutes and seconds hands are stopped. The timer is reset by momentarily interrupting the energizing voltage fed to an input 48f of the timer. Resetting of the timer returns the minutes and seconds hands 48d and 48e to a zero position.

The clock unit 52 of the remote cabinet 50 operates in the same way as the timer 48 in that it has three operating states, namely a reset state where the minutes and seconds hands 52a and 52b thereof are at a zero position, a timing state where the hands 52a and 52b move to indicate the time which has lapsed since the beginning of the timing interval and an inactive state when the hands 52a and 52b are stopped.

A source of alternating current is connected to the input 48f of the timer through a normally closed section 49a of the reset switch 49 and the normally opened contacts Ry–1 of the timer control relay Ry. As soon as the relay Ry is energized, energizing voltage is fed to the timer through the contacts Ry–1 which set the timer into its timing state which closes the timing contacts 47 for the timing interval set on the timer. Interruption of the feeding of energization voltage to the timer input 48f automatically resets the timer, as indicated above.

The reset switch 49 has a normally opened section 49b connected in series with a source of reset voltage. When the reset switch is momentarily depressed, the source of reset voltage is coupled through the normally opened section 49b of the reset switch to a reset line 105 extending to the reset input of the binary counter 91 to reset the same to zero, and reset line 107 extending to the reset input 100a of the timer bistable 100 to reset the same. The measuring circuit is now in a position to measure average typing speed for a new set of pulses fed to the circuit 70.

The clock unit 52 has an input circuit which extends through the normally closed reset switch section 49a and the normally opened set of contacts Ry–1 of the timer control relay Ry. The clock unit 52 is thus set into operation by energization of the relay Ry and is reset upon momentary opening of the reset switch section 49a like the timer 48.

Refer now to FIG. 4 which illustrates another aspect of the invention involving the means by which the student stations are monitored from the instructor station with a minimum number of wires extending therebetween. In the form of the invention illustrated in the drawings, each of the student select switches 32 includes a pair of ganged single pole, double throw switch sections 32a–32a', 32b–32b', 32c–32c', 32d–32d', etc. Each of these switch sections has a stationary contact and a movable contact. As illustrated, the stationary contacts for each of the switch sections 32a, 32b, 32c, 32d, etc. are respectively connected to a first series of terminals 110a, 110b, 110c, 110d, etc. which are connected to the pulse output terminals of the magnetic core units 62a, 62b, 62c, etc. at the various student stations. The stationary contacts of the other switch sections 32a', 32b', 32c', 32d', etc. are respectively connected to a second series of terminals 110a', 110b', 110c', 110d', etc. which are connected through respective lines 115a', 115b', 115c', 115d', etc. to the input side of the volume control potentiometers 13a, 13b, 13c, 13d, etc. at the student stations. All of the movable contacts of the switch sections 32a, 32b, 32c, 32d, etc. are connected to a common switch terminal 112 and all the movable contacts of the switch sections 32a', 32b', 32c', 32d', etc. are connected to a common terminal 114. The common terminal 112 is connected by a conductor 117 and a normally closed set of contacts R1–3 of a push to talk relay R1 to the input of the typewriter speed and rhythm measuring circuit 70. Thus, operation of one of the switch sections 32a, 32b, 32c, etc. will connect the core windings 62a, 62b, 62c, etc. of the selected student station to the input of the measuring and indicating circuit 70. The terminal 112 is also connected through a set of normally opened contacts R1–2 of the push to talk relay R1 to a source of D.C. voltage for reasons to be explained.

The common terminal 114 associated with the student select switches 32a', 32b', 32c', 32d', etc. is connected through a line 120 and a normal-monitor switch 122 to the instructor's earphones 26. The switch 122 may be mounted in any number of positions, such as on the panel 22' in the console drawer 17'. The normal-monitor switch 122 includes a stationary contact 122a connected to the line 120, a stationary contact 122b for monitor operation to be described and a movable contact 122c for making selective contact between the contacts 122a and 122b.

A volume control potentiometer 124 which may be mounted in any suitable place within the console 17 is placed in the line extending to the earphones 26 so that the instructor can adjust the volume of the sound in the earphones 26.

The common terminal 114 is connected through a line 125 and a set of normally opened contacts R1–1 of the push to talk relay R1 to a normal-record switch 130 in turn connected to the instructor's microphone 24. The switch 130 has a stationary contact 130a connected to the contacts R1–1, a stationary contact 130b connected to a circuit to be described and a movable contact 130c which makes selective contact with the contacts 130a and 130b.

When the movable contact 130c is connected to the stationary normal contacts 130a, the instructor's microphone 24 will be connected to the common terminal 114 of the student select switches when the push to talk relay R1 is energized. When one of the student select switches 32 is closed, the instructor's earphone 26 will be connected through one of the associated switch sections 32a', 32b', 32c', or 32d', etc. and the lines 115a', 115b', 115c', 115d', etc. to the earphones 7a, 7b, 7c, 7d, etc. of the selected student station.

The push to talk relay R1 has a coil with one end grounded and the other end connected through the normally opened section 44a of the push to talk switch 44. On depression of the push to talk switch 44, the relay R1 will be connected to a 45 volt line 129. Energization of the relay R1 opens normally closed contacts R1–3 to disconnect the input of the measuring and indicating circuit 70 from the student stations and closes the normally opened contacts R1–1 to connect the instructor's microphone 24 to common terminal 114 extending to the selected student station, so that the instructor can communicate with the student.

The energization of the relay R1 also disconnects the selected student station from the information channels, which are identified in FIG. 4 by lines 134–1, 134–2, 134–3 and 134–4. Each student select switch 9a, 9b, 9c, 9d, etc. has four stationary contacts 137–1, 137–2, 137–3 and 137–4 respectively connected to the information channel lines 134–1, 134–2, 134–3 and 134–4, and a movable contact 139 for making selective contact with the contacts 137–1 through 137–5. The movable contact 139 is connected through a set of normally closed contacts 140–1 of a channel disconnect relay 140 to the input side of the associated volume control potentiometers 13a, 13b, etc. The channel disconnect relay 140 has a coil with one end grounded and the other end connected to the associated line 115a, 115b, 115c or 115d, etc. extending to the instructor's student select switches 32. Thus, energization of the channel disconnect relay 140 will open the contacts 140–1 to disconnect the associated student earphone from the channel select switch involved.

The channel disconnect relay 140 at the selected student station is energized when the push to talk switch 44 of the instructor station is depressed. Depression of the switch 44 energizes the push to talk relay R1 and closes the set of normally opened contacts R1–2 connected between the positive 45 volt line 129 and the line 119 extending to the common terminal 112 of the student select switches 32. As previously indicated, energization of the relay R1 will also disconnect the line 117 from the input of the measuring and indicating circuit 70 so that the 45 volts appearing on the line 117 will not adversely effect the circuit 70. The resulting 45 volts on the line 11 is connected through the switch section 32a, 32b, 32c of the switch 32 which is then operated to energize the channel disconnect relay 140 of the selected student station. The resulting disconnection of the associated earphone from the selected information lines 134–1 through 134–4 will enable the instructor to speak to the student without any interference from the information channel involved.

As previously indicated, when one of the switches 32 is operated, one of the indicators 38 will be energized to indicate the particular information channel selected by the student station connected to the instructor station. The various indicators repectively identified by reference numerals 38–1, 38–2, 38–3 and 38–4 in FIG. 4 are connected to an alternating current supply bus 143 through normally opened contacts R2–1, R3–1, R4–1 and R5–1 of respective control relays R2, R3, R4, and R5. One end of the coils R2, R3, R4, and R5 are grounded and the other ends are connected respectively through series resonant circuits 145–1, 145–2, 145–3, and 145–4 to the information lines 134–1, 134–2, 134–3 and 134–4. Each series resonant circuit is tuned to a frequency beyond the audible range, such as 40 kilocycles per second.

A 40 kilocycles per second oscillator 147 is provided which feeds the input of an amplifier 149. The output of the amplifier 149 is connected through a potentiometer 151 to the input of an amplifier 153. The potentiometer 151 may be located any place within the console 17 such as on the panel 22' in the console drawer 17'. The output of the amplifier 153 is connected to the line 120 extending to the common terminal 114 of the student select switches. Thus, upon operation of one of the student select switches 32, the 40 kilocycle signal will be connected through the switch section 32a', 32b', 32c' or 32d', etc. involved to the associated line 115a', 115b', 115c' or 115d', etc. extending to the earphone circuit at the selected student station. As shown in the drawings, lines 115a, 115b, etc. are connected directly through the channel disconnect contacts 140–1 to the movable contacts 139 of the associated channel selector switches 140 so that the 40 kilocycle signal will appear on the information channel line 134–1 through 134–4 selected by the student at the station involved. This 40 kilocycle signal in turn will be coupled to one of the series resonant circuits 145–1 through 145–4 to energize the associated relay R2, R3, R4 or R5 which, in turn, energizes the associated indicator light 38–1, 38–2, 38–3 or 38–4. By associating the 40 kilocycle signal with the circuitry in the manner just described, it is apparent that no additional wires are required for adding the channel indicator lights.

The various information lines 134–1 through 134–4 are fed from the outputs of three tape channels 150, 152 and 154 and one phonograph channel 156 forming part of the phonograph and tape unit 16 which is mounted in one of the compartments in the console 17. The tape channels may include conventional tape and pickup units 150a, 152a and 154a whose outputs are coupled through suitable volume control potentiometers 158, 160 and 162 to amplifiers 164, 166 and 168 respectively. The outputs of the latter amplifiers are respectively connected to the information lines 134–1, 134–2 and 134–3. The phonograph channel 156 may have a conventional turntable and pickup unit 156a whose output is connected through a volume control potentiometer 172 to the input of an amplifier 174 whose output is connected to the information line 134–4.

The tape channel 154 illustrated in the drawing has a recording input 180 for recording on the tape of the associated tape and pickup unit 154a. The input 180 is connected to the movable contact 185a of a record selector switch 185. The switch 185 has stationary contacts 185b and 185c with which the movable contact 185a makes selective contact. The stationary contact 185b is connected by a line 187 to the stationary contact 130b of the normal-record switch 130. In the record position of the switch 130, the instructor's microphone 24 is connected by the line 187 to the stationary contact 185b of the record selector switch 185 so that the voice of the instructor is coupled to the input 180 of the tape and pickup unit 155a.

The other stationary contact 185c of the record selector switch 185 is connected by a line 188 to the output of the potentiometer 172 coupled to the output of the phonograph and pickup unit 170. Thus, information recorded on a phonograph disc can be coupled through the line 188 and the stationary contact 185c of the record selector switch to the input of the tape and pickup unit 154a.

The amplitude of the signals at the output of the tape amplifiers 164, 166 and 168, the phonograph amplifier 174 and the 40 kilocycle oscillator amplifier 153 is adjusted by potentiometers 158, 160, 162, 172 and 151 which may be mounted on the panel 22' in the console drawer 17'. The instructor is aided in adjusting the amplitude of these signals by a volume indicating meter 191 which is mounted on the panel 22'. The meter 191 is connected to the movable contact 193a of a selector switch 193 and to the stationary contact of the normal-monitor switch 122. The movable contact 193a makes selective contact with a number of stationary contacts 193b, 193c, 193d, 193e and 193f. The contacts 193b through 193f are respectively connected to the various information lines 134–1, 134–2, 134–3, 134–4 and to the output of the 40 kilocycle oscillator amplifier 153 respectively. It is thus apparent that the volume indicating meter 191 and the instructor's earphone can be selectively connected to the output of any of the amplifiers referred, so that the associated potentiometers can be adjusted to provide signals of the proper amplitude.

The present invention has thus provided an extremely simple and effective system for monitoring both instantaneous and average typing speeds of the typists at any one of a number of student stations. As previously indicated, some of the aspects of the monitoring system have a broad application in instructional systems generally, although they have a particularly important utility in typewriter instruction classes.

It should be understood that numerous modifications may be made in the preferred form of the invention described above without deviating from the broader aspects of the invention.

What I claim as new and desire to protect by Letters Patent of the United States is:

1. Typewriter speed and rhythm indicating apparatus comprising: pulse generating means for generating a unidirectional pulse of standard width and amplitude each time the operator depresses a type key or spacer bar, averaging means for providing a measurement of the average area of the waveform of a series of pulses of the output of said pulse generating means over a given base period including only a small number of pulses at the lowest type rate to be measured, and indicating means for displaying said measurement in words per minute, for indicating the instantaneous variations in typing speed and rhythm.

2. The typewriter speed and rhythm indicating apparatus of claim 1 wherein said indicating means is a recording means which provides a permanent visible record of the waveform of said measurement in words per minute.

3. Typewriter speed an rhythm indicating apparatus comprising: pulse generating means for generating a unidirectional pulse of standard width and amplitude each time the operator depresses a type key or spacer bar, averaging means for providing a measurement of the average area of the waveform of a series of pulses of the output of said pulse generating means over a given base period including only a small number of pulses at the lowest typing rate to be measured, and indicating means for displaying said measurement, said averaging means including capacitor integrating means coupled to the output of said pulse generating means, and said indicating means including a D.C. meter movement coupled to the output of said capacitor integrating means and calibrated in words per minute, said scale factor varying means for varying the deflection of the meter movement for a given pulse repetition rate of the pulses generated by said pulse generating means.

4. Typewriter speed indicating apparatus comprising: pulse generating means for generating a pulse each time the operator depresses a type key or spacer bar thereof, a pulse divider having an input coupled to said pulse generating means for producing one pulse at its output for each given number of pulses fed to the input thereof representing a given word unit, and typewriter speed indicating means for counting said pulses over a base period to indicate the average typing speed over the base period, said typewriter speed indicating means including a pulse counter coupled to the output of said pulse divider, means for displaying a count in said counter, and adjustable timing means operable during a timing interval for controlling the length of the period during which said pulse counter is responsive to said pulse and including a control element for rendering said pulse counter responsive to said pulses only during the timing interval.

5. Typewriter speed and rhythm indicating apparatus comprising: pulse generating means for generating a pulse each time the operator depresses a type key or spacer bar thereof, and typewriter speed indicating means for counting said pulses over a base period to indicate the average typing speed over the base period, said typewriter speed indicating means including a pulse counter, means for displaying a count in said counter and adjustable timing means for controlling the length of the period during which said pulse counter is responsive to said pulses, said timing means having a reset state where the feeding of energizing current to the timing means will start a timing interval, a timing state when the timing means is operating during the timing interval and an inactive state at the end of the timing interval and before the timing means is reset, and a control element in said timing means for rendering said pulse counter responsive to said pulses only during the timing interval, a source of energizing current, timer control means having a reset state for disconnecting said source of energizing current from said timing means and a set state for connecting said source of energizing current to said timing means to initiate a timing interval, means for setting said timer control means upon the presence of any of said pulses, and manual reset means for simultaneously resetting said timing means and said timer control means to prepare the apparatus for a new measurement operation.

6. In a monitoring system including a number of student practice stations each having a first device operable by the student for producing electrical signals in accordance with the way the device is operated, a speaker device for receiving information to be communicated to the student, a number of different information channels to be selected by the student, and an information channel select switch at each student station for selecting any one of a number of information channels, the improvement comprising: an instructor station including indicating means responsive to said electrical signals and common to all the student stations for giving an indication of the operation of the first device of a selected student station, an instructor's speaker device for enabling an instructor to listen to the selected information channel at a selected student station, an instructor's microphone for communicating with the student at the selected student station, and student selector switch means including a first series of terminals respectively extending to the speaker devices at the various student stations, a first common terminal coupled both to the instructor's speaker device and the instructor's microphone, a second series of terminals respectively extending to the outputs of the first devices at the various student stations, a second common terminal coupled to the input of said common indicating means, and a manually operable control for connecting a selected one of said first series of terminals to said first common terminal, to effect coupling of the instructor's speaker device and microphone to the input of the speaker device of a selected student station, the instructor in such case hearing the information channel selected by the student involved, and for connecting a selected one of said second series of terminals to said second common terminal to couple the signals generated by the first device at the selected student station to said indicating means.

7. In a monitoring system including a number of student practice stations each having a first device operable by the student for producing electrical signals in accordance with the way the device is operated, a speaker device for receiving information to be communicated to the student, a number of different information channels to be selected by the student, and an information channel select switch at each student station for selecting any one of a number of information channels, the improvement comprising: an instructor station including indicating means responsive to said electrical signals and common to all the student stations for giving an indication of the operation of the first device of a selected student station, an instructor's speaker device for enabling an instructor to listen to the selected information channel at a selected student station, and student selector switch means including a first series of terminals respectively extending to the speaker devices at the various student stations, a first common terminal coupled both to the instructor's speaker device and the instructor's microphone, a second series of terminals respectively extending to the outputs of the first devices at the various student stations, a second common terminal coupled to the input of said common indicating means, and a manually operable control for connecting a selected one of said first series of terminals to said first common terminal to effect coupling of the instructor's speaker device and microphone to the input of the speaker device of the selected student station, the instructor in such case hearing the information channel selected by the student involved, and for connecting a selected one of said second series of terminals to said second common terminal to couple the signals generated by the first device at the selected student station to said indicating means, a channel disconnect relay at each student station, and an instructor's talk switch for operating the channel disconnect relay of the student station selected by the instructor, said operation of said relay disconnecting the speaker device of the selected student station from the selected information channel.

8. The monitoring system of claim 7 wherein there is provided a source of current for operating the channel disconnect relay at each student station, means connecting each channel disconnect relay in parallel with the output of the first device of the associated student station, and means responsive to operation of said instructor's talk switch for simultaneously disconnecting said second common terminal of said instructor's student select switch means from said indicating means and connecting said source of current to said second common terminal thereof for operating the channel disconnect relay of the selected student station without affecting said indicating means.

9. In a monitoring system including a number of student stations each having a typewriter with type keys and a spacer bar operable by the student, and a speaker device for receiving information to be communicated to the student, a number of different information channels respectively transmitting information at different word rates, a student operable channel select switch at each student station, and pulse generating means at each typewriter for generating a pulse each time the student operates the type key or spacer bar, the improvement comprising an instructor station including a typewriter speed measuring circuit common to all the student stations given an indication of typewriter speed in accordance with the rate of the pulses fed thereto, an instructor's speaker device for enabling an instructor to listen to the selected channel at a selected student station, and student selector switch means including a first series of terminals respectively extending to the outputs of the pulse generating means at the various student stations, a second series of terminals respectively extending to the speaker devices at the various student stations, a first common terminal coupled to the input of said common measuring circuit, a second common output coupled to the instructor's speaker device, and a manually operable control for connecting a selected one of said first series of terminals to said first common terminal to couple the pulses generated at the selected student station to said measuring circuit, and for connecting a selected one of said second series of terminals to said second common terminal to effect coupling of the instructor's speaker device to the input of the speaker device of the selected student station, the instructor in such case hearing the information channel selected by the student involved.

10. In an educational system including a number of student learning stations to which information is to be communicated to the student, a number of information lines extending to each of the student practice stations on which different information signals are fed, a speaker device at each student station for listening to the information signals, and an information line select switch at each student station, the select switch having a number of input terminals respectively connected to said information lines and a common output terminal coupled to the associated speaker device and which is selectively connected to one of said input terminals, the improvement comprising an instructor station, a source of control signals at a frequency beyond the audible range, instructor's student select switch means at said instructor station having a first series of terminals respectively coupled to the common output terminal of the information line select switch of the various student stations, the instructor's student select switch means further having manually operable control means for connecting a selected one of said first series of terminals to said instructor's speaker device and said source of control signals, a number of visual indicators visible to the instructor for indicating the information line selected by the selected student, said visual indicators each having a control circuit selectively responsive to the presence of said control signals for operating the associated indicator, means connecting the control circuits at the various visual indicators respectively to said information lines leading to the student stations, whereby the connection of a selected one of said first series of terminals of said instructor's student select switch means to said source of control signals will operate the visual indicator indicating the information signals being heard by the selected student by coupling of the control signals to the control circuit of the latter visual indicator through the information line selected by the student involved.

11. In an educational system including a number of student practice stations each having a first device to be operated by the student in accordance with information to be communicated to the student and producing electrical signals in accordance with the manner in which the device is operated, a number of information lines extending to each of the student practice stations on which different information signals are fed, a speaker device at each student station for listening to the information signals, and an information line select switch at each student station, the select switch having a number of input terminals respectively connected to said information lines and a common output terminal coupled to the associated speaker device and which is selectively connected to one of said input terminals, the improvement comprising an instructor station including an instructor's speaker device for listening to the information line selected by a given student, a common indicating means responsive to the electrical signals of the first device of a selected student station for indicating the manner in which the first device is operated, a source of control signals at a frequency beyond the audible range, instructor's student select switch means at the instructor station having a first series of terminals respectively coupled to the common output terminals of the information line select switch of the various student stations and a second series of terminals coupled respectively to the electrical outputs of the various first devices at the various student stations, the instructor's student select switch means further having manually operable control means for connecting a selected one of said first series of terminals to said instructor's speaker device and said source of control signals and a selected one of said second series of terminals thereof to said indicating means, a number of visual indicators visible to the instructor for indicating the information line selected by the selected student, said visual indicators each having a control circuit responsive to the presence of a control signal at said given frequency for operating the associated indicator, means connecting the control circuits at the various visual indicators respectively to said information lines leading to the student stations, whereby the connection of a selected one of said first series of terminals of said instructor's student select switch means to said source of control signals will operate the visual indicator indicating the information signals being heard by the selected student by the coupling of the control signals to the control circuit of the latter visual indicator through the information line selected by the student involved.

References Cited by the Examiner
UNITED STATES PATENTS

| | | | |
|---|---|---|---|
| 2,348,744 | 5/1944 | McMurray | 35—5 |
| 2,995,706 | 8/1961 | Clarridge | 307—88.5 |
| 3,200,516 | 8/1965 | Parker | 35—35.3 |

EUGENE R. CAPOZIO, *Primary Examiner.*

R. E. KLEIN, *Assistant Examiner.*